US006296274B1

(12) United States Patent
Stevens et al.

(10) Patent No.: US 6,296,274 B1
(45) Date of Patent: Oct. 2, 2001

(54) APPARATUS FOR INFLATING A SIDE CURTAIN

(75) Inventors: Halley O. Stevens, Mesa; John P. O'Loughlin, Gilbert; Jon J. Freesmeier, Mesa, all of AZ (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/502,685

(22) Filed: Feb. 11, 2000

(51) Int. Cl.$^7$ ................................................. B60R 21/28
(52) U.S. Cl. ................ 280/741; 280/730.2; 280/790.2; 280/736; 280/737; 280/740; 280/742; 102/530; 102/531
(58) Field of Search ................... 280/730.2, 730.1, 280/736, 737, 740, 741, 742; 102/530, 531

(56) References Cited

U.S. PATENT DOCUMENTS

| 3,602,309 |   | 8/1971  | Hill . |
|-----------|---|---------|--------|
| 4,899,663 |   | 2/1990  | Thorn . |
| 5,364,127 | * | 11/1994 | Cuevas .................................. 280/741 |
| 5,365,651 | * | 11/1994 | Rogers et al. ........................ 280/736 |
| 5,845,933 | * | 12/1998 | Walker et al. ........................ 280/741 |
| 5,865,462 | * | 2/1999  | Robins et al. ................. 280/730.2 X |
| 5,908,204 | * | 6/1999  | Smith .................................... 280/741 |
| 6,073,961 | * | 6/2000  | Bailey et al. .................. 280/730.2 X |
| 6,082,761 | * | 6/2000  | Kato et al. .................... 5280/730.2 X |
| 6,142,519 | * | 11/2000 | Smith .................................... 280/741 |
| 6,158,767 | * | 12/2000 | Sinnhuber ......................... 280/730.2 |
| 6,164,688 | * | 12/2000 | Einsiedel et al. .................... 280/741 |
| 6,176,514 | * | 1/2001  | Einsiedel et al. ................. 280/730.2 |

FOREIGN PATENT DOCUMENTS

| 2348835 | * | 9/1973 | (DE) ...................................... 280/741 |
| 2406645 | * | 2/1974 | (DE) .................................. 280/741 X |
| 2275100 | * | 8/1994 | (GB) ...................................... 280/741 |

OTHER PUBLICATIONS

Article entitled "Van Nostrand's Scientific Encyclopedia", Sixtth Edition, 1983, pp. 2560–2561.
Co–pending U.S. Patent appln. Ser. No. 946,152, filed Oct. 7, 1997, entitled "Staged Pyrotechnic Air Bag Inflator".
Co–pending U.S. Patent appln. Ser. No. 09/259,362, filed Feb. 26, 1999, entitled "Stored Gas Inflator Assembly".

* cited by examiner

Primary Examiner—Lanna Mai
Assistant Examiner—Toan To
(74) Attorney, Agent, or Firm—Tarolli, Sundhein, Covell Tummino & Szabo L.L.P.

(57) ABSTRACT

A vehicle occupant safety apparatus (10) includes an inflatable vehicle occupant protection device (20) and a container (32) for storing gas (36) under pressure. The container (32) has an outlet (38). The apparatus (10) includes a mechanism (42) for opening the container (32) to release the gas (36) to flow from the outlet (38) at supersonic speed. The apparatus (10) also includes a pyrotechnic material (70) which is ignitable to generate gas for helping to inflate the inflatable device (20). The pyrotechnic material (70) is ignitable in response to being impacted by the gas (36) flowing from the outlet (38) at supersonic speed. The apparatus (10) further includes a conduit (50) directing at least a first portion of the gas (36) flowing from the container (32) to the pyrotechnic material (70) to ignite the pyrotechnic material.

12 Claims, 1 Drawing Sheet

APPARATUS FOR INFLATING A SIDE CURTAIN

BACKGROUND OF THE INVENTION

1. Technical Field

The present invention relates to a vehicle safety apparatus and, in particular, to a side curtain assembly including a side curtain which remains inflated for an extended period of time for helping to protect an occupant of a vehicle.

2. Description of the Prior Art

It is known to inflate a vehicle occupant protection device, such as an air bag, to help protect a vehicle occupant. The protection device is inflated by inflation fluid from an inflator. One type of protection device is a side curtain. The side curtain is inflatable into a position between the vehicle occupant and the vehicle side structure to help protect the vehicle occupant in the event of a side impact to the vehicle.

It is known to inflate a side curtain initially with inflation fluid at a relatively high pressure and flow rate, then to maintain the side curtain inflated for an extended period of time with a continued flow of inflation fluid at a relatively low rate. One known inflator which can effect such an extended inflation of a side curtain uses one or more ignitable pyrotechnic charges which can burn for an extended period of time. Another known inflator uses two containers of stored gas that are released at different rates into the side curtain.

SUMMARY OF THE INVENTION

The present invention is a vehicle occupant safety apparatus comprising an inflatable vehicle occupant protection device and a container for storing gas under pressure. The container has an outlet. The apparatus includes a mechanism for opening the container to release the gas to flow from the outlet at supersonic speed. The apparatus also includes a pyrotechnic material, which is ignitable to generate gas for helping to inflate the inflatable device. The pyrotechnic material is ignitable in response to being impacted by the gas flowing from the outlet at supersonic speed. The apparatus further includes a conduit directing at least a first portion of the gas flowing from the container to the pyrotechnic material to ignite the pyrotechnic material.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DETAILED DESCRIPTION OF AN EMBODIMENT OF THE INVENTION

Figure 1:
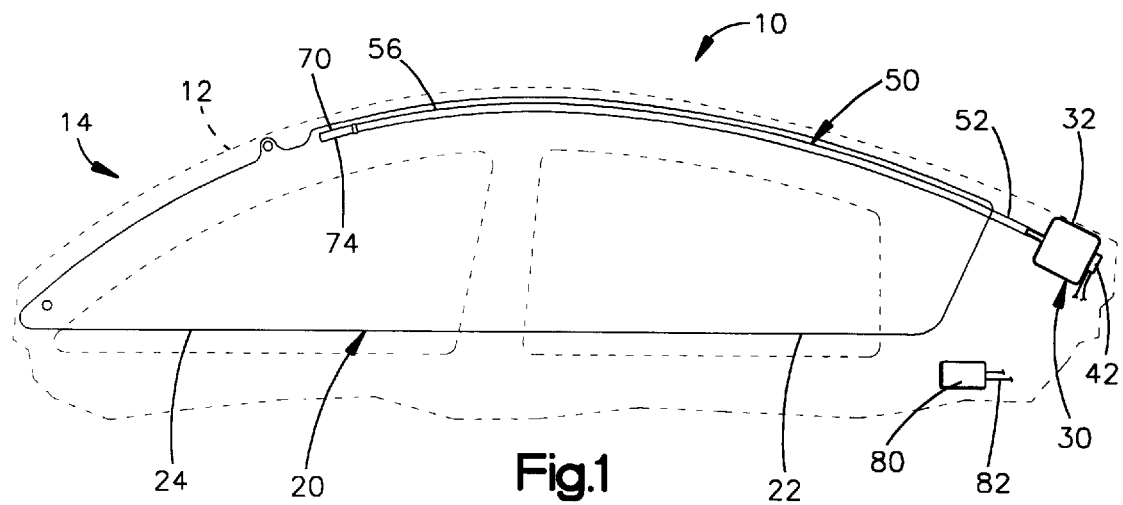
FIG. 1 is a schematic view of a portion of a vehicle including a side curtain assembly in accordance with the present invention.

The present invention relates to a vehicle safety apparatus and, in particular, to a side curtain assembly including a side curtain which remains inflated for an extended period of time for helping to protect an occupant of a vehicle in the event of a side impact to the vehicle. The present invention is applicable to various side curtain assembly constructions. As representative of the present invention, FIG. 1 illustrates a side curtain assembly 10.

The side curtain assembly 10 is mounted adjacent the side structure 12 of a vehicle 14. The side curtain assembly 10 includes a side curtain shown schematically at 20. The side curtain 20 has first and second opposite end portions 22 and 24. The side curtain 20 is movable from a deflated and stowed condition (not shown) to an inflated condition as illustrated in FIG. 1, to help to protect occupants of the vehicle 14 in the event of a side impact to the vehicle or a rollover condition of the vehicle.

The side curtain assembly 10 includes a primary inflation fluid source in the form of an inflator 30. The inflator 30 is a stored gas inflator that includes a container 32. The container 32 defines a chamber 34 containing a quantity of an inflation fluid 36 such as helium gas stored at a high pressure.

An outlet opening 38 in the container 30 is closed by a closure 40 such as a rupturable burst disk. An initiator 42 on the inflator 30 is electrically actuatable to open the closure 40 to release the gas 36 stored in the container 32. The initiator 42 may open the closure 40 in a variety of ways, such as, by weakening or rupturing the closure with flame or a shock wave from the initiator or with a shaped projectile or other material that is fired at the closure by the initiator. The inflator 30 includes no pyrotechnic or heat-generating material other than that which may be contained in the initiator 42, and thus is of the type known commonly as a "cold gas inflator".

The side curtain assembly 10 also includes a conduit or fill tube 50 for directing inflation fluid from the inflator 30 to the side curtain 20. The fill tube 50 is a metal or plastic tube that extends along the length of the side curtain 20. The fill tube 50 has a first end portion 52 located adjacent the first end portion 22 of the side curtain 20. The first end portion 52 of the fill tube 50 is connected in fluid communication with the outlet 38 of the inflator 30 by a nozzle 54. A downstream end or second end portion 56 of the fill tube 50 is located adjacent the second end portion 24 of the side curtain 20.

The fill tube 50 has a central passage 58 that extends for the length of the fill tube. The central passage 58 is filled with ambient air 60 prior to actuation of the inflator 30. The fill tube 50 has a plurality of fluid nozzles 62 located intermediate its first and second end portions 52 and 56. The fluid nozzles 62 in the fill tube 50 are in fluid communication with the interior of the side curtain 20. Thus, inflation fluid directed into the central passage 58 in the fill tube 50 can flow through the nozzles 62 into the side curtain 20 to inflate the side curtain.

The side curtain assembly 10 includes a secondary inflation fluid source in the form of a pyrotechnic material 70. The pyrotechnic material 70 is a solid material that generates gas when ignited. The pyrotechnic material 70 includes a main body portion 72 made from a material that is ignitable to generate a sufficient quantity of gas to maintain the side curtain 20 in an inflated period for an extended period of time. Suitable materials include a fuel, such as RDX (cyclotrimethylene trinitramine) or HMX (cyclotetramethylene tetranitramine), in combination with an oxidizer, such as phase stabilized ammonium nitrate.

The pyrotechnic material 70 is located in a container indicated schematically at 74. The container 74 is fixed to the vehicle side structure 12 at the second end portion or downstream end of the fill tube 56. The pyrotechnic material 70 has an end surface 76 that is presented toward the interior of the fill tube 50. The pyrotechnic material 70 is preferably configured as an end burning charge in the container 74.

Figure 2:
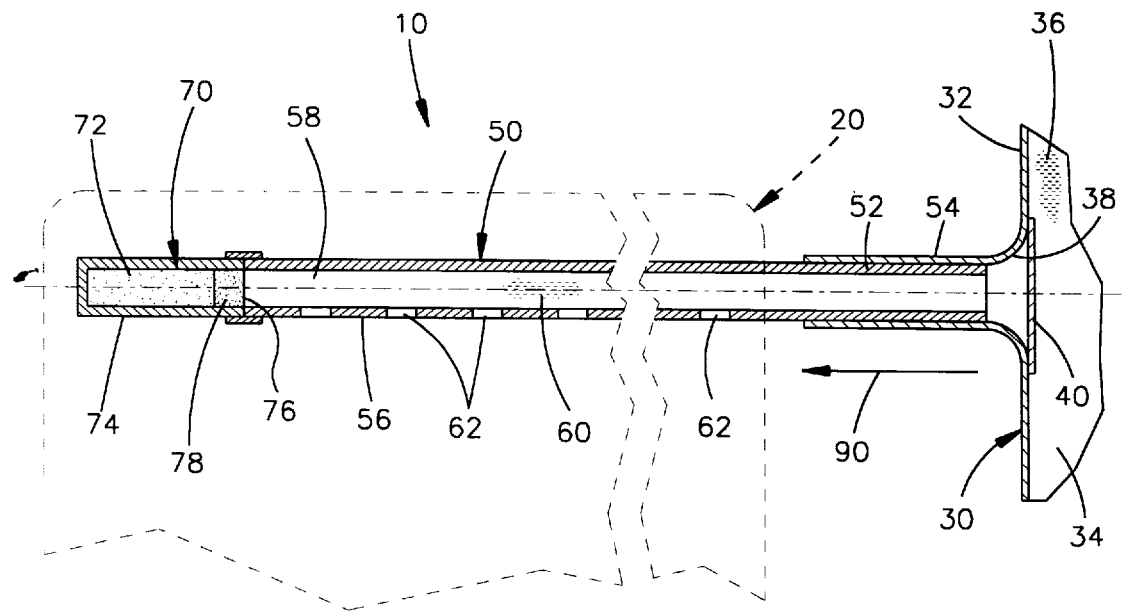
FIG. 2 is an enlarged schematic view of the side curtain assembly of FIG. 1.

A portion of the pyrotechnic material 70 optionally comprises an ignition material 78 that is ignitable at a lower temperature than the main body portion 72 and that burns quickly to generate heat to ignite the main body portion. Suitable materials for the ignition material 78 include those that are commonly used for igniting solid propellant materials in air bag inflators, such as $BKNO_3$. The ignition material 78, if present as illustrated in FIG. 2, is located between the main body portion 72 and the central passage 58 in the fill tube 50.

The vehicle 14 includes known means indicated schematically at 80 (FIG. 1) for sensing a collision involving the vehicle and for actuating the inflator 30 in response to a side impact to the vehicle or a rollover condition of the vehicle. The means 80 provides an electrical actuation signal over lead wires 82 to the inflator 30. The actuation signal actuates the initiator 42 to rupture the burst disk 40. Inflation fluid 36 in the form of gas under pressure flows out of the container 32 and into the central passage 58 in the first end portion 52 of the fill tube 50. The gas 36 flows through the fill tube 50 in a direction toward the second end portion 56 of the fill tube, as indicated by the arrow 90 in FIG. 2.

The gas 36 flowing from the container 32 rapidly fills the fill tube. Most of the gas 36 immediately flows out of the fill tube 50, through the nozzles 62, into the side curtain 20. The side curtain 20 is inflated quickly because of the relatively high pressure and flow rate of the inflation fluid 36 flowing from the inflator 30. This flow continues for a relatively short period of time, for example, about 15 to 20 milliseconds. This relatively short period of time is long enough to inflate the side curtain 20 to help protect a vehicle occupant in the event of a side impact to the vehicle 14 or a rollover condition of the vehicle.

During this initial flow of inflation fluid 36 into the side curtain 20, the pyrotechnic material 70 is ignited. This ignition occurs as a result of flow of gas 36 from the inflator 30 into contact with the pyrotechnic material 70. Specifically, the gas 36 is stored in the container 32 at a high pressure, in the range of from about 2,000 psi to about 6,000 psi or more. When this high pressure gas 36 is released from the container 32, it flows along the central passage 58 in the fill tube 50 at a supersonic speed. The resulting interaction between the leading edge of the rapidly flowing gas 36 and the ambient air 60 in the fill tube 50 creates a shock wave in the fill tube.

The shock wave is manifested as a disturbance in the air 60 and in the inflation fluid 36 that causes the temperature and pressure of the air and inflation fluid to increase dramatically at the location of the leading edge of the gas flow. The temperature of the air 60 and inflation fluid 36 at that location increases to a temperature in the range of from 500 Kelvin to 3000 Kelvin or more.

The shock wave, including the area of elevated temperature fluid, travels along with the leading edge of the rapidly flowing gas 36, in the direction 90, until it reaches the second end portion 56 of the fill tube 50. A portion of the flowing gas 36, in which the shock wave is formed, strikes or impacts the pyrotechnic material 70. Temperatures developed at the second end portion 56 of the fill tube 50 as a result of the shock wave are well above the auto-ignition temperature of the pyrotechnic material 70. The pyrotechnic material 70 is ignited.

The ignited pyrotechnic material 70 generates inflation fluid in the form of gas. This gas is discharged into the second end portion 56 of the fill tube 50 and flows through the fill tube in a direction opposite the direction 90. The gas generated by the pyrotechnic material 70 flows out of the fill tube 50 through the nozzles 62 into the side curtain 20.

The pyrotechnic material 70 continues to supply inflation fluid to the side curtain 20 after the initial flow of gas 36 from the container 32 is exhausted. This make-up flow of fluid from the pyrotechnic material 70 is at a relatively slow rate because the pyrotechnic material is configured as an end burn type charge, which burns in a direction from the fill tube 50 to the closed end of the container, that is, to the left as viewed in FIG. 2.

The pyrotechnic material 70 generates inflation fluid only at a rate sufficient to compensate or make up for pressure loss in the side curtain 20 through leakage or cooling. Thus, the fluid pressure in the side curtain 20 can be maintained at a desired relatively constant level, allowing the side curtain to remain filled for occupant protection for five to ten seconds or more, and preferably at least seven seconds. This extended period of time is long enough to help prevent a vehicle occupant from being ejected from the vehicle 14 during a rollover event.

The actual capacities and output rates of the stored gas container 32 and the pyrotechnic material 70 are dependent on numerous factors, including, but not limited to, the pressure at which the inflation fluid 36 is stored, the volume of the side curtain 20, the required inflation rate and permeability of the side curtain, the required inflation pressure when the occupant first strikes the side curtain, and the required inflation pressure at a later time to prevent occupant ejection during a rollover accident.

From the above description of the invention, those skilled in the art will perceive improvements, changes and modifications in the invention. Such improvements, changes and modifications within the skill of the art are intended to be covered by the appended claims.

Having described the invention, we claim:

1. A vehicle occupant safety apparatus comprising:
    an inflatable vehicle occupant protection device;
    a container for storing gas under pressure, said container having an outlet;
    a mechanism for opening said container to release said gas to flow from said outlet at supersonic speed;
    a pyrotechnic material which is ignitable to generate gas for helping to inflate said inflatable device, said pyrotechnic material being ignitable in response to being impacted by said gas flowing from said outlet at supersonic speed; and
    a conduit directing at least a first portion of said gas flowing from said outlet to said pyrotechnic material to ignite said pyrotechnic material.

2. An apparatus as set forth in claim 1 wherein said conduit has openings located inside said inflatable device for directing a second portion of said gas flowing from said container into said inflatable device to inflate said inflatable device.

3. An apparatus as set forth in claim 2 wherein said pyrotechnic material when ignited generates gas that flows into said conduit and through said openings into said inflatable device to help inflate said inflatable device.

4. An apparatus as set forth in claim 1 comprising air in said conduit prior to opening of said container, said gas that flows from said container contacting said air in said conduit to create a shock wave in said conduit that travels along said conduit from said container to impact said pyrotechnic material.

5. An apparatus as set forth in claim 4 wherein said shock wave comprises a disturbance in said air and said gas that creates a region of increased temperature that impacts said pyrotechnic material to ignite said pyrotechnic material when said shock wave impacts said pyrotechnic material.

6. An apparatus as set forth in claim 1 wherein said pyrotechnic material is located at an end of said conduit remote from said container, the opening of said container creating a region of increased temperature that moves along said conduit from said container to said pyrotechnic material and impacts said pyrotechnic material to ignite said pyrotechnic material.

7. An apparatus as set forth in claim 1 wherein said first portion of said gas flowing through said conduit creates a shock wave that impacts said pyrotechnic material to ignite said pyrotechnic material.

8. An apparatus as set forth in claim 7 wherein said shock wave includes a region of increased temperature that impacts said pyrotechnic material to ignite said pyrotechnic material.

9. A method comprising the steps of:

providing an inflatable vehicle occupant protection device;

storing gas under pressure in a container having an outlet;

opening the container to release the gas to flow from the outlet at supersonic speed;

providing a pyrotechnic material which is ignitable to generate gas for helping to inflate the inflatable device, the pyrotechnic material being ignitable in response to being impacted by the gas flowing from the outlet at supersonic speed; and directing at least a portion of the gas flowing from the outlet to the pyrotechnic material to ignite the pyrotechnic material.

10. A method as set forth in claim 9 wherein said step of directing at least a portion of the gas flowing from the container to the pyrotechnic material to ignite the pyrotechnic material comprises:

providing a conduit that extends between the container outlet and the pyrotechnic material; and:

creating a shock wave that travels along said conduit and impacts said pyrotechnic material to ignite said pyrotechnic material.

11. A method as set forth in claim 10 wherein said step of providing a conduit comprises the step of providing a conduit having openings located inside the inflatable device for directing a second portion of the gas flowing from the container into the inflatable device to inflate the inflatable device.

12. A method as set forth in claim 9 further comprising the step of directing gas generated by ignition of said pyrotechnic material into the inflatable device to help inflate the inflatable device.

* * * * *